(12) United States Patent
Sinclair et al.

(10) Patent No.: US 7,734,604 B1
(45) Date of Patent: Jun. 8, 2010

(54) LOCKING DATA IN A DATABASE AFTER AN OPERATION HAS BEGUN

(75) Inventors: Paul L. Sinclair, Manhattan Beach, CA (US); Albert Maghbouleb, Los Angeles, CA (US)

(73) Assignee: Teradata US, Inc., Miamisburg, OH (US)

( * ) Notice: Subject to any disclaimer, the term of this patent is extended or adjusted under 35 U.S.C. 154(b) by 2232 days.

(21) Appl. No.: 09/713,887

(22) Filed: Nov. 16, 2000

(51) Int. Cl.
*G06F 7/00* (2006.01)
*G06F 17/00* (2006.01)
(52) U.S. Cl. .................................... 707/704
(58) Field of Classification Search ............... 707/1–10, 707/200–206, 100–104.1; 709/227, 238; 711/171
See application file for complete search history.

(56) References Cited

U.S. PATENT DOCUMENTS

| | | | | |
|---|---|---|---|---|
| 5,485,607 A | * | 1/1996 | Lomet et al. | ................... 707/8 |
| 5,546,579 A | * | 8/1996 | Josten et al. | ................... 707/8 |
| 5,745,703 A | * | 4/1998 | Cejtin et al. | ................. 709/238 |
| 6,070,170 A | * | 5/2000 | Friske et al. | ................. 707/202 |
| 6,101,497 A | * | 8/2000 | Ofek | ........................... 707/10 |
| 6,460,055 B1 | * | 10/2002 | Midgley et al. | ............. 707/204 |

\* cited by examiner

*Primary Examiner*—Hosain T Alam
*Assistant Examiner*—Navneet K Ahluwalia
(74) *Attorney, Agent, or Firm*—John Cowart; Harden E. Stevens, III

(57) ABSTRACT

A database management system receives a request to perform an operation on a set of target data and, at some point after it begins executing that operation, places a lock on the target data to prevent concurrent execution of other operations on the target data. In some embodiments, the system receives an instruction from a user to perform a data-definition operation on a set of target data; places an initial lock on the target data at a level that allows at least one concurrent operation on the target data; begins executing the operation; and then places a final lock on the target data at a level that excludes all other concurrent operations on the target data.

25 Claims, 2 Drawing Sheets

LOCKING DATA IN A DATABASE AFTER AN OPERATION HAS BEGUN

BACKGROUND

Database systems are nearly ubiquitous in modern-day business operations. Most business concerns electronically store at least some sort of information about their operations, inventory, transactions, and customers in database systems. Many companies use very large database systems, commonly known as data warehouses, to better understand the various aspects of their businesses and thus gain competitive advantage over rival companies. Data warehousing systems typically include a complex network of information processing and storage subsystems, complete with analysis tools that help their owners make sense of the vast amounts of information stored in the systems.

In general, companies that use data warehousing systems perform hundreds and even thousands of data-analysis and data-manipulation operations, such as loading data into the databases and retrieving data through database queries, on those systems on a daily basis. These companies also perform routine maintenance or data-definition operations, such as organizing the data into tables and creating indices for these tables, many times per week. Historically, these maintenance operations have required exclusive access to portions of the database and thus have involved the use of locking procedures that prevent, for limited time periods, the execution of data-manipulation operations on the affected portions of the databases. In many data warehousing systems, the number and length of these maintenance operations is very substantial and thus significantly impacts the amount of time that the systems are available for data-manipulation operations. As a result, these maintenance operations are usually carried out in "off-hour" periods, typically in the late-night or early-morning hours.

As the amount of data stored in data warehousing systems and the numbers of concurrent users of those systems increase, the amount of time needed for performing data-manipulation operations is also increasing. Many companies now perform data-manipulation operations well into the off-hour periods during which maintenance operations traditionally have occurred. These companies quite frequently must choose between completing certain data-manipulation operations and initiating maintenance operations that lock portions of the database.

SUMMARY

Described below is a database management system that receives a request to perform an operation on a set of target data and, at some point after it begins executing that operation, places a lock on the target data to prevent concurrent execution of other operations on the target data. In some embodiments, the system receives an instruction from a user to perform a data-definition operation on a set of target data; places an initial lock on the target data at a level that allows at least one concurrent operation on the target data; begins executing the operation; and then places a final lock on the target data at a level that excludes all other concurrent operations on the target data.

Other features and advantages will become apparent from the description and claims that follow.

DETAILED DESCRIPTION

Figure 1:
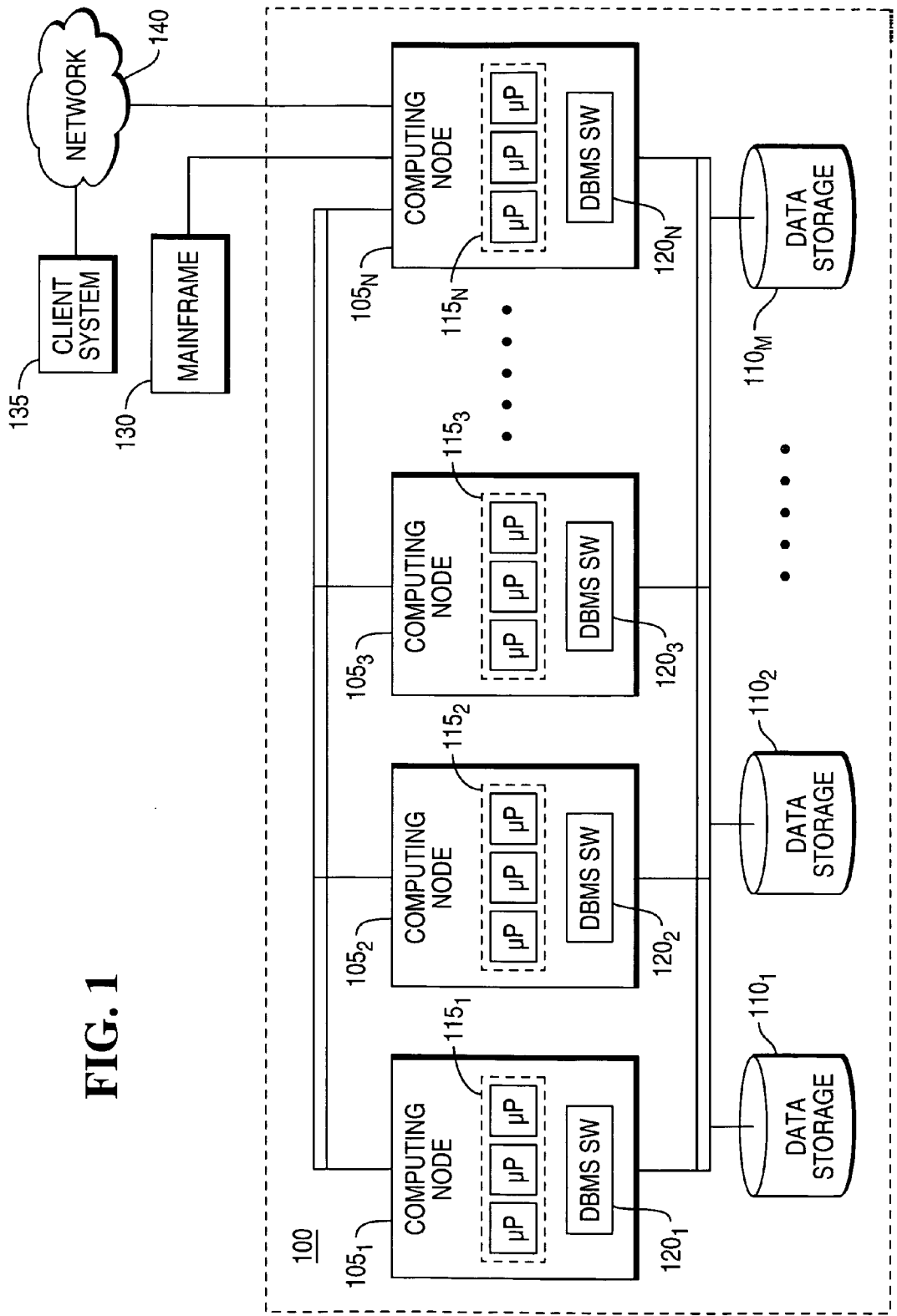
FIG. 1 is a block diagram of a database system having a massively parallel processing (MPP) architecture.

FIG. 1 shows a data warehousing system 100 that operates under control of a database-management system (DBMS) program. The DBMS program performs many types of maintenance operations that, in traditional DBMS designs, normally place exclusive locks on portions of the database as soon as those operations begin and maintain those locks throughout the operations. The DBMS program in this system 100 is designed to use less severe locks, or no locks at all, when these operations begin. The system upgrades these locks to exclusive locks when necessary to complete the operations. As a result, many of these maintenance operations can execute concurrently with other operations, including data-analysis and data-manipulation operations, which previously could not take place while the maintenance operations were executing. This type of concurrent execution provides greater database accessibility. Allowing the database user to select the initial lock level for each operation provides even greater flexibility, giving the user greater control over system performance and accessibility.

The data warehousing system 100 includes one or more computing nodes $105_{1 \ldots N}$ that manage the storage and retrieval of data in one or more data storage facilities $110_{1 \ldots M}$. Each of the computing nodes $105_{1 \ldots N}$ is driven by a processing subsystem $115_{1 \ldots N}$ that includes one or more processing units, or CPUs. In general, all of the CPUs within a node share operating system and memory resources.

Within each node, the processing subsystem $115_{1 \ldots N}$ operates under the control of at least one instance $120_{1 \ldots N}$ of the DBMS program. In a data warehousing system built on a massively parallel processing (MPP) platform, the each node runs several instances of the DBMS program, each forming a virtual processor that is assigned to manage some subset of the data in the storage facilities. Each DBMS process manages the assigned data in the database and governs access to the data by performing a prescribed set of operations on the data. In general, a user initiates these operations by delivering instructions through a remote computer system, such as a mainframe 130 connected directly to the database system or a client system 135 connected through a network 140. The user typically enters the instructions using a prescribed database-query language, such as the Structured Query Language (SQL) put forth by the American National Standards Institute (ANSI).

The operations performed by the database-management system include data-definition operations and data-manipulation operations, such as locking tables in the database; creating modifying, and deleting table definitions; inserting, deleting, or modifying rows of data within the tables; and retrieving data from the definitions and the tables. Data-definition operations are defined by a data-definition language (DDL) and typically include operations such as CREATE TABLE, CREATE INDEX and DROP USER. Data-manipulation operations are defined by a data-manipulation language (DML) and typically include operations such as INSERT, DELETE, UPDATE and SELECT.

In general, each of these operations requires the DBMS process to lock some portion of the data so that the data is not corrupted by another process as the operation is carried out. Locking the data also prevents other DBMS operations from retrieving invalid or corrupt data. The DBMS process can place any one of several types of locks on a block of data, each with a unique level of severity. EXCLUSIVE locks prevent any concurrent access on the locked data by any other DBMS operations and thus are the most severe locks. WRITE locks prevent all concurrent READ, WRITE and EXCLUSIVE locks on the locked data. READ locks prevent all concurrent WRITE and EXCLUSIVE locks. ACCESS locks, the least severe, prevent only concurrent EXCLUSIVE locks on the locked data. Table I below illustrates the effects of these four types of locks.

TABLE I

| CURRENT | REQUESTED LOCK | | | |
|---|---|---|---|---|
| LOCK | ACCESS | READ | WRITE | EXCLUSIVE |
| NONE | Granted | Granted | Granted | Granted |
| ACCESS | Granted | Granted | Granted | Queued |
| READ | Granted | Granted | Queued | Queued |
| WRITE | Granted | Queued | Queued | Queued |
| EXCLUSIVE | Queued | Queued | Queued | Queued |

Locking data inhibits system performance by slowing the processing of concurrent operations. Many operations in traditional databases lock data for the duration of the operations even when the potential for corrupting or invalidating the data exists only during some portion of the operation. For example, a traditional CREATE INDEX operation requires an EXCLUSIVE lock on an entire table for the duration of the operation. This prevents any other type of concurrent access to that table, including that which does not alter the table or the data in it, at any time during the operation.

The DBMS program of FIG. 1 improves system performance through increased concurrency by reducing the severity of the locks that certain operations initially place on the data. The DBMS program then upgrades these locks to more severe levels when necessary to complete the operations. For example, CREATE INDEX operations begin not with EXCLUSIVE locks on the affected table, but with less severe locks, such as WRITE locks or READ locks. The DBMS upgrades these locks to EXCLUSIVE locks when necessary to complete the CREATE INDEX operations—i.e., after subtables are created but before the associated data dictionaries and table headers are modified. In some implementations, the DBMS program allows the database user to choose the initial lock levels for these operations.

Applying reduced-severity locks at the outset of data-definition operations allows a greater number of concurrent data-manipulation operations to occur while the data-definition operations are in progress, thus improving system throughput and, in turn, system performance. Below are some examples of the types of DDL statements that are subject to reduced-severity locks and the impact that these locks have on other operations.

A. Collect Statistics

In a typical database-management system, a COLLECT STATISTICS operation places a row-hash WRITE lock on certain blocks of data for the entire operation. The DBMS program of FIG. 1 delays this row-hash WRITE lock, placing no lock on the data, until after it has computed the requested statistics. Delaying the row-hash WRITE lock in this manner increases concurrency by allowing data-manipulation operations, such as SELECT, INSERT and DELETE operations, to occur on the target data over most of the time during which the COLLECT STATISTICS operation executes.

B. Create Index

Database-management systems normally place an EXCLUSIVE lock on a table upon initiating a CREATE INDEX operation for that table. The DBMS program of FIG. 1 replaces the initial EXCLUSIVE lock with a WRITE lock on the target table. Alternatively, the DBMS process allows the user to specify an initial lock level (e.g., a READ, ACCESS or SHARE lock) and places this type of lock on the table. The DBMS process then upgrades this reduced-severity lock to an EXCLUSIVE lock on the table after it creates the index subtables, but before it locks and modifies the corresponding data dictionary and before it modifies the table headers.

Beginning with a reduced-severity lock in this manner allows the CREATE INDEX statement to run concurrently with certain data-manipulation operations, such as a SELECT operation that places an ACCESS or READ lock on the table before the CREATE INDEX operation upgrades to an EXCLUSIVE lock. This also allows the CREATE INDEX operation to run concurrently on the table with other data-definition operations, such as a COLLECT STATISTICS operation, until one of the operations upgrades to an EXCLUSIVE lock. Because CREATE INDEX operations typically occur over relatively long periods of time, reducing the initial lock severity of these operations can produce significant improvements in system throughput.

C. Alter Table . . . , Fallback

Database management systems normally place an EXCLUSIVE lock on an entire table upon initiating an ALTER TABLE . . . , FALLBACK operation on that table. The DBMS program of FIG. 1 instead places a WRITE lock on the table at the outset of this type of operation. Alternatively, the DBMS program uses some other reduced-severity lock specified by the database user.

As with the CREATE INDEX statement, beginning an ALTER TABLE . . . , FALLBACK statement with a reduced-severity lock allows the operation to run concurrently with certain data-manipulation operations, such as a SELECT operation, targeting the same table. The ALTER TABLE . . . , FALLBACK operation in this case can also run concurrently with other data-definition operations, such as a COLLECT STATISTICS operation, until one of the operations upgrades to an EXCLUSIVE lock.

D. Modify Database/User

For most MODIFY DATABASE/USER operations, the DBMS program replaces the traditional EXCLUSIVE lock on the targeted database/user with an ACCESS lock. In some implementations, the DBMS program also removes the row-hash WRITE lock that conventional database-management systems place on the database that is the immediate parent of the database or user targeted by the operation. For MODIFY DATABASE/USER operations in which the user specifies certain options, such as the "SPOOL," "TEMP" and "PERM" options, the DBMS program replaces a traditional table-level WRITE lock on the space-management table with two row-hash locks: (1) a READ lock (SPOOL or TEMP) or WRITE lock (PERM) on the space-management entry for the immediate parent of the targeted database/user, and (2) a WRITE lock on the space-management entry for the targeted database/user. This allows the MODIFY DATABASE/USER operation to run concurrently with almost all DML statements. A MODIFY DATABASE/USER statement for which the user has specified the "SPOOL," "TEMP" or "PERM" option can run concurrently with any DML statement that does not target the same database or user as the MODIFY statement.

Upon receiving an instruction to perform one of these operations on the database, the DBMS program determines both the initial and final locks associated with the operation.

In those cases in which the user is allowed to specify the initial lock level, the DBMS program applies the lock specified by the user. Table II illustrates the effects for some of these operations.

TABLE II

| OPERATION | INITIAL LOCK | FINAL LOCK |
| --- | --- | --- |
| COLLECT STATISTICS | None or User-defined | WRITE on row-hash |
| CREATE INDEX | WRITE on table or User-defined (at least a READ lock) | EXCLUSIVE on table |
| ALTER TABLE . . . , FALLBACK | WRITE on table or User-defined (at least a READ lock) | EXCLUSIVE on table |

Figure 2:
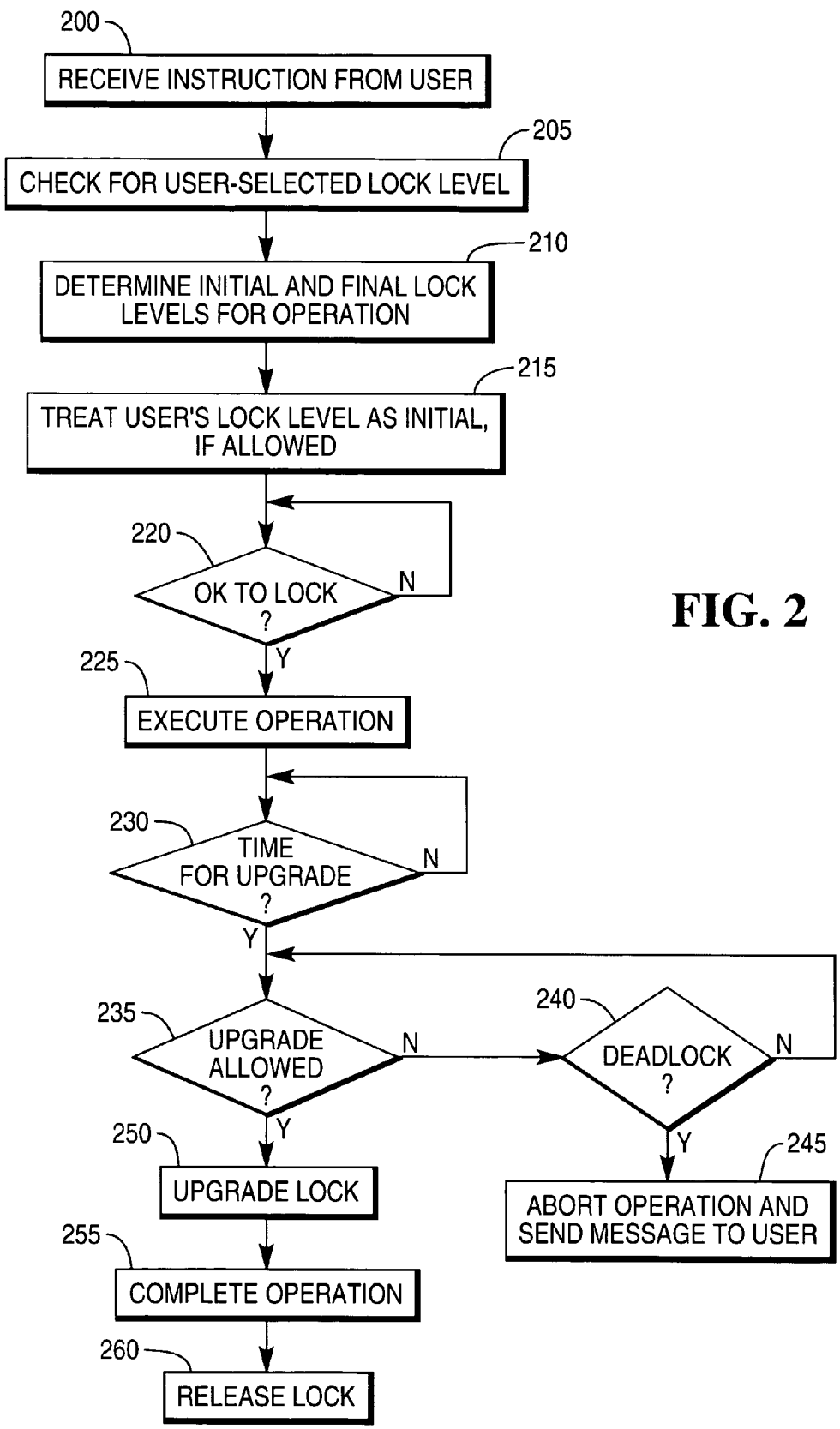
FIG. 2 is a flow chart of a technique for locking data in the database system after an operation targeting the data has begun.

FIG. 2 is a flow chart showing one technique for implementing reduced-severity locking in a database-management system. The system first receives an instruction from a user to perform a data-definition or data-manipulation operation on the database (step 200). In a typical database system, the user enters the instruction as a Structured Query Language (SQL) command through an interface program, such as a UNIX command-line interface. Upon receiving the instruction, the system determines whether any user-specified lock levels are included in the instruction (step 205). The system then determines the initial and final lock levels for the operation (step 210; see also Table II). If the operation is of a type that allows user-defined locking, the system replaces the initial lock specified in the table with that specified by the user (step 215).

After determining the initial and final lock levels, the system attempts to place the initial lock on the target data (step 220). If the data is already locked by another operation that prevents placement of the lock (see Table I), the system queues the current operation until the other operation is complete. When the system succeeds in placing the initial lock on the target data, it begins executing the operation on the locked data (step 225).

The system proceeds with execution until it reaches the point at which it must upgrade the lock severity to complete the operation (step 230). The system then attempts to upgrade to the more severe lock (step 235). If the system finds that another operation has locked the data at a level that prevents the upgrade (see Table I), it queues the upgrade until the other operation is complete. If the attempted upgrade causes a deadlock condition (step 240), the system aborts the current operation and sends a message instructing the user to resubmit the operation (step 245), as described in more detail below. Upon successfully upgrading to the more severe lock (step 250), the system completes the operation (step 255) and then releases the lock on the target data (step 260).

Under some circumstances, applying a less severe lock at the outset of an operation might increase the chances of deadlock. For example, a deadlock might occur when a CREATE INDEX or ALTER TABLE operation begins with a WRITE lock on a table and executes concurrently with a data-manipulation operation using an ACCESS lock that will upgrade to a READ, WRITE or EXCLUSIVE lock on the same table. The likelihood that a deadlock actually will occur depends on the workload and transaction mix of a given database application. Overall, deadlock conditions occur very infrequently.

One way of handling deadlock conditions is aborting one of the operations (e.g., the later-issued operation) and sending a message instructing the user to resubmit the aborted operation. Aborting operations in this manner to defuse deadlock conditions inhibits system performance, but the performance gains achieved through increased concurrency outweigh the effects of deadlock. Allowing the user to specify the initial lock level gives the user greater control over the affects of this performance tradeoff.

Computer-Based and Other Implementations

The various implementations of the invention are realized in electronic hardware, computer software, or combinations of these technologies. Most implementations include one or more computer programs executed by a programmable computer. In general, the computer includes one or more processors, one or more data-storage components (e.g., volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above describes one or more specific embodiments of the broader invention. The invention also is carried out in a variety of alternative embodiments and thus is not limited to those described here. Therefore, other embodiments are within the scope of the following claims.

We claim:

1. A method for use in managing data in a database system, comprising:
   receiving a request to perform an operation on a set of target data residing in the database;
   executing the operation in the database on the set of target data;
   during the execution of the operation, placing an initial lock on the target data to prevent concurrent execution of at least one operation on the target data; and
   during the executing of the operation, placing a final lock on the target data at a level that prevents concurrent execution of a larger set of operations.

2. The method of claim 1, comprising placing an initial lock on the target data at a level that prevents concurrent execution of at least one operation and, at some point after execution has begun, placing a final lock on the target data at a level that prevents concurrent execution of a larger set of operations.

3. The method of claim 1, where the initial lock allows concurrent execution of operations that involve reading the target data.

4. The method of claim 1, where the final lock prevents concurrent execution of all operations on the target data.

5. The method of claim 1, further comprising allowing a user to specify the type of lock initially placed on the data.

6. The method of claim 1, where the operation is one of the following types: a COLLECT STATISTICS operation, a CREATE INDEX operation, and an ALTER TABLE operation.

7. A database system comprising:
   at least one storage device;
   at least one computing node configured to deliver data to and retrieve data from the storage device; and
   a database-management component configured to:

receive a request to perform an operation on a set of target data residing in the database;

execute the operation in the database on the set of target data;

during the execution of the operation, place an initial lock on the target data to prevent concurrent execution of at least one but not all operations on the target data; and during the executing of the operation, place a final lock on the target data at a level that prevents concurrent execution of a larger set of operations.

8. The system of claim 7, where the initial lock allows concurrent execution of at least one other operation on the target data.

9. The system of claim 7, where the subsequent lock prevents concurrent execution of all other operations on the target data.

10. The system of claim 7, where the database-management system is configured to allow a user to specify the type of lock initially placed on the data.

11. The system of claim 7, comprising multiple computing nodes and multiple storage devices, where each storage node is configured to manage storage of data on at least a subset of the storage devices.

12. The system of claim 11, where the database-management system is configured to place locks on a block of data that is spread across more than one of the storage devices.

13. The system of claim 7, where the operation is one of the following types: a COLLECT STATISTICS operation, a CREATE INDEX operation, and an ALTER TABLE operation.

14. A computer program, stored on at least one computer-readable storage medium, for use in managing data in a database system, comprising executable instructions that, when executed by a computer, cause the computer to:

receive a request to perform an operation on a set of target data residing in the database;

execute the operation in the database on the set of target data;

during the executing of the operation, place an initial lock on the target data to prevent concurrent execution of at least one but not all operations on the target data; and during the executing of the operation, place a final lock on the target data at a level that prevents concurrent execution of a larger set of operations.

15. The program of claim 14, where the initial lock allows concurrent execution of at least one other operation on the target data.

16. The program of claim 14, where the subsequent lock prevents concurrent execution of all other operations on the target data.

17. The program of claim 14, where the program causes the computer to allow a user to specify the type of lock initially placed on the data.

18. The program of claim 14, where the operation is one of the following types: a COLLECT STATISTICS operation, a CREATE INDEX operation, and an ALTER TABLE operation.

19. A method for use in managing data in a database system, comprising:

receiving an instruction from a user to perform a data-definition operation on a set of target data residing in the database;

placing an initial lock on the target data at a level that allows at least one concurrent operation on the target data;

executing the operation in the database on the set of target data;

during the execution of the operation, placing an initial lock on the target data to prevent concurrent execution of at least one but not all operations on the target data; and during the execution of the operation, placing a final lock on the target data at a level that excludes all other concurrent operations on the target data.

20. The method of claim 19, further comprising allowing a user to select the level of the initial lock.

21. The method of claim 19, where placing an initial lock on the target data includes placing one of the following types of locks on the target data: an ACCESS lock; a READ lock; and a WRITE lock.

22. The method of claim 19, where placing a final lock on the target data includes placing an EXCLUSIVE lock on the target data.

23. The method of claim 19, where placing an initial lock on the target data includes locking an entire table.

24. The method of claim 19, where receiving the instruction from the user includes receiving an instruction to perform one of the following operations: a CREATE INDEX operation, a COLLECT STASTICS operation, and an ALTER TABLE operation.

25. A method for use in managing data in a database system, comprising:

receiving an instruction from a user to perform a data-definition operation on a set of target data;

placing an initial lock on the target data at a level that prevents at least one but not all types of concurrent operation on the target data;

initiating execution of the operation on the target data; and during the execution of the operation, placing a final lock on the target data at a level that excludes all types of concurrent operations on the target data.

* * * * *